Patented July 14, 1936

2,047,880

UNITED STATES PATENT OFFICE 2,047,880

ADHESIVE

Daniel S. Morse, Swarthmore, Pa.

No Drawing. Application March 4, 1936,
Serial No. 67,177

16 Claims. (Cl. 91—68)

My invention relates to improvements in the joining of vulcanized rubber compounds to metals, glass, molded phenolic condensation products, previously vulcanized hard rubber and the like. My invention includes an improved process for effecting such adhesion and a prepared adhesive material for such use.

Satisfactory adhesion between brass and such rubber compounds can be effected by vulcanizing the rubber compound in contact with the brass and in conventional practice this type of adhesion has been that most commonly, if not almost exclusively, used. In connection with metals other than brass, this conventional practice has required, as a preliminary, the brass plating of such other metal, and, of course, it is not usable in connection with materials which cannot be satisfactorily brass plated.

I have discovered that, by appropriate exposure of one surface of a sheet or film of a rubber compound including a vulcanizing agent, zinc oxide and glue or para-coumarone-indene resin to actinic radiation while shielding the other surface from such exposure, an adhesive film can be produced which on the exposed surface will adhere to iron, steel, aluminum, lead, zinc, galvanized iron, tinned iron, molded phenolic condensation products, hard rubber and glass, for example, and which on the unexposed surface will adhere to the usual rubber compounds when vulcanized in contact with the metal, or the like, and this rubber compound on opposite surfaces. The unexposed surface of this adhesive film will adhere to the usual soft rubber compounds both when such rubber compounds are vulcanized with the adhesive film and when such rubber compounds have been previously vulcanized; this unexposed surface will adhere to the usual hard rubber compounds, however, only when the hard rubber compound is vulcanized with the adhesive film. By appropriate exposure of both surfaces, an adhesive film can be produced useful for joining materials other than vulcanized rubber compounds, such as those enumerated. In other words, it is thus possible to join glass to iron, hard rubber to phenolic condensation products, and so forth.

An adhesive film embodying my invention can be produced, for example, by compounding in the usual manner

|  | Parts by weight |
|---|---|
| Smoked sheets | 1,000 |
| Sulfur | 40 |
| Diphenylguanidine | 10 |
| Glue | 150 |
| Zinc oxide | 750 |
| Paracoumarone-indene resin | 60 |
| Magnesium oxide | 60 | sheeting this compound to a thickness, for example, of approximately 0.030 inches, and exposing a surface of this sheet to actinic radiation.

Either the glue or the paracoumarone-indene resin may be omitted from the foregoing compound, although they are with advantage both included.

Instead of producing the adhesive film by sheeting, as in the foregoing example, it may be produced, for example, by coating a piece of duck with the compound in the form of a cement, in any conventional rubber solvent, evaporating the solvent and exposing a surface of the thus formed film to actinic radiation. It may also be produced for further example, on the surface of the rubber compound to be joined to metal, or the like, by coating this latter compound with the adhesive compound in the form of a cement, evaporating the solvent and exposing the thus formed film to actinic radiation.

The radiation more particularly effective to effect the purpose of my invention appears to lie within the range of the shorter wave-lengths of the visible spectrum. When rubber compounds of the kind above referred to first are subjected to the shorter wave-lengths of the visible spectrum, or to wave lengths in the range of the ultraviolet, they become more tacky, but upon further exposure lose all or most of their tackiness. It is necessary, in order to obtain the results of this invention, that the exposure be for a length of time sufficient to reduce the tackiness of the rubber compound. However, the duration of exposure will vary with the quality and the intensity of the radiation at the exposed surface. In any particular case, this period is best determined by test. Such test is conveniently carried out by vulcanizing portions of the sheet with the exposed surface in contact with iron, for example, following progressively increased periods of exposure to the particular radiation. As the period of exposure is lengthened, good adhesions while cold, although not while hot, are first developed and, with some longer period of exposure, good adhesions while hot are developed. Direct sunlight will, over sufficient periods of exposure, produce the result. The tungsten filament incandescent lamp apparently will not produce the result within any reasonable period of exposure. Commercially, exposure to the radiation of the carbon arc lamp is advantageous. Good adhesions, to iron for example, can thus be developed in periods as short or even shorter than 90 minutes. Care should be taken to avoid prevulcanization during irradiation.

The adhesions developed by my invention are such that the strength of the adhesive film is important as otherwise failure of the film prevents useful development of the full strength of the adhesion. The foregoing specific compound is adapted to develop good adhesion with good film strength upon vulcanization for 10 minutes at 60 pounds steam pressure (gauge). The proportion of sulphur, the vulcanizing agent, and the accelerator and the proportion of accelerator, if any, may be selected in accordance with conventional compounding practice to develop good film strength under the particular conditions of vulcanization to which the adhesive film is to be subjected. Again, care should be taken, with respect to acceleration of the compound, to avoid prevulcanization due to any elevation of temperature involved in the particular irradiation.

The particular rubber used is not important. For example, first latex crepe may be substituted for smoked sheets in the foregoing compound or 50 parts of each may be used in the foregoing compound.

Zinc oxide apparently serves a dual function in that it also assists in developing maximum film strength and the proportion in which it is used may be selected, on this basis, in accordance with conventional compounding practice.

The glue and the paracoumarone-indene resin also serve in a dual capacity, assisting in smooth calendering, or sheeting, of the compound and thus in improving the effective strength of the junctions formed in the practice of my invention.

For best results, lubricants such as paraffin should not be included in the compound.

In carrying out the process of my invention, to join a soft vulcanized rubber compound to iron, or the like, the prepared adhesive sheet of my invention, unvulcanized, is placed between the iron and the rubber compound, which may then be either vulcanized or unvulcanized, with the exposed surface of the adhesive sheet against the iron and the unexposed surface against the rubber compound, which if previously vulcanized should be cemented for best results and, after establishing firm and continuous contact between the several surfaces thus brought together as by appropriate pressure, the adhesive sheet, and the rubber compound if previously unvulcanized, is then vulcanized. If the adhesive sheet and the rubber compound to be joined to the metal, or the like, are to be vulcanized together, they should be of composition consistent with simultaneous vulcanization. If the rubber compound is vulcanized before being joined with the metal, or the like, the composition of the adhesive sheet should be such as to permit vulcanization of the adhesive sheet without degradation, through over-vulcanization, of the previously vulcanized rubber compound. This can be accomplished by increased acceleration of the rubber compound of the adhesive sheet, for example. In the joining of relatively thin layers of vulcanized rubber compounds to metal or the like, as in the application of protective rubber coverings to exposed metal or in the lining of metal containers for example, the prepared adhesive sheet may be made of the required thickness and joined to the metal, or the like, by vulcanization in situ, as an integral layer, or a composite unitary layer comprising a sheet of the adhesive cemented to a sheet of a different rubber compound may be so joined to the metal or the like.

In carrying out the process of my invention, to join a hard vulcanized rubber compound to iron, or the like, the prepared adhesive sheet of my invention, unvulcanized, is placed between the iron and the rubber compound, which must then be unvulcanized, with the exposed surface of the adhesive sheet against the iron and the unexposed surface against the rubber compound, and, after establishing firm and continuous contact between the several surfaces thus brought together as by appropriate pressure, the adhesive sheet and the rubber compound are simultaneously vulcanized.

The exposed surface of the prepared adhesive material of my invention does not need the protection required for the surfaces of rubber compounds to be joined to other rubber compounds. To assist in holding the adhesive sheet or film in position on the metal, or the like, to which it is to be joined prior to and during vulcanization, the metal, or the like, may be preliminarily heated, for example to a temperature of 220°–230° F.

While, for the purpose of illustration, I have detailed a specific embodiment of my invention, an advantageous embodiment of my invention, it will be understood that my invention is not limited to the specific details of composition and procedure of the illustration.

In particular, although I have hitherto secured best results by the use of compounds including zinc oxide and either or both glue and paracoumarone-indene resin, the fundamental of my invention appears to be exposure of a surface of the sheet or film of the compound to actinic radiation for a length of time sufficient to reduce its tackiness prior to vulcanization followed by vulcanization of the sheet or film with this exposed surface in contact with the material to which adhesion is to be effected. Compounding materials resembling zinc oxide in catalytic activity with respect to actinic radiation, such as clay and barytes, may be useful as a substitute for zinc oxide. Other resins similar to the resin commercially known as paracoumarone-indene resin may also be useful as substitutes for glue and paracoumarone-indene resin.

In referring to "sheets" of the adhesive compound of the invention, in the following claims, it will be understood that the reference is intended to include sheets, films or coatings, as explained in the foregoing.

This application is a continuation-in-part of my application for Adhesives, Serial Number 1,159, filed January 10, 1935.

I claim:

1. In joining vulcanized rubber compounds to metals, glass, molded phenolic condensation products, hard rubber and the like, the improvement which comprises inserting a sheet of a rubber compound, including a vulcanizing agent, zinc oxide and glue, one surface of which has been exposed to actinic radiation for a period sufficiently beyond that at which the tackiness of the rubber may be increased to reduce its tackiness, between the first-mentioned rubber compound and the material to which it is to be joined with the exposed surface against said material and with the unexposed surface against the first-mentioned rubber compound and vulcanizing said sheet of rubber compound in that position.

2. In joining vulcanized rubber compounds to metals, glass, molded phenolic condensation products, hard rubber and the like, the improvement which comprises inserting a sheet of a rubber compound, including a vulcanizing agent, zinc oxide and paracoumarone-indene resin, one surface of which has been exposed to actinic radiation for a period sufficiently beyond that at which the tackiness of the rubber may be increased to reduce its tackiness, between the first-mentioned rubber compound and the material to which it is to be joined with the exposed surface against said material and with the unexposed surface against the first-mentioned rubber compound and vulcanizing said sheet of rubber compound in that position.

3. In joining vulcanized rubber compounds to metals, glass, molded phenolic condensation products, hard rubber and the like, the improvement which comprises inserting a sheet of a rubber compound, including a vulcanizing agent, zinc oxide, paracoumarone-indene resin and glue, one surface of which has been exposed to actinic radiation for a period sufficiently beyond that at which the tackiness of the rubber may be increased to reduce its tackiness, between the first-mentioned rubber compound and the material to which it is to be joined with the exposed surface against said material and with the unexposed surface against the first-mentioned rubber compound and vulcanizing said sheet of rubber compound in that position.

4. In joining vulcanized rubber compounds to metals, glass, molded phenolic condensation products, hard rubber and the like, the improvement which comprises inserting a sheet of a rubber compound, including a vulcanizing agent, one surface of which has been exposed to actinic radiation for a period sufficiently beyond that at which the tackiness of the rubber may be increased to reduce its tackiness, between the first-mentioned rubber compound and the material to which it is to be joined with the exposed surface against said material and with the unexposed surface against the first-mentioned rubber compound and vulcanizing said sheet of rubber compound in that position.

5. In joining vulcanized rubber compounds to metals, glass, molded phenolic condensation products, hard rubber and the like, the improvement which comprises forming a sheet of a rubber compound, including a vulcanizing agent, zinc oxide and glue, exposing one surface of the sheet to actinic radiation for a period sufficiently beyond that at which the tackiness of the rubber may be increased to reduce its tackiness, inserting the exposed sheet between the first-mentioned rubber compound and the material to which it is to be joined with the exposed surface against said material and with the unexposed surface against the first-mentioned rubber compound and vulcanizing the sheet in that position.

6. In joining vulcanized rubber compounds to metals, glass, molded phenolic condensation products, hard rubber and the like, the improvement which comprises forming a sheet of a rubber compound, including a vulcanizing agent, zinc oxide and paracoumarone-indene resin, exposing one surface of the sheet to actinic radiation for a period sufficiently beyond that at which the tackiness of the rubber may be increased to reduce its tackiness, inserting the exposed sheet between the first-mentioned rubber compound and the material to which it is to be joined with the exposed surface against said material and with the unexposed surface against the first-mentioned rubber compound and vulcanizing the sheet in that position.

7. In joining vulcanized rubber compounds to metals, glass, molded phenolic condensation products, hard rubber and the like, the improvement which comprises forming a sheet of a rubber compound, including a vulcanizing agent, exposing one surface of the sheet to actinic radiation for a period sufficiently beyond that at which the tackiness of the rubber may be increased to reduce its tackiness, inserting the exposed sheet between the first-mentioned rubber compound and the material to which it is to be joined with the exposed surface against said material and with the unexposed surface against the first-mentioned rubber compound and vulcanizing the sheet in that position.

8. In joining vulcanized rubber compounds to metals, glass, molded phenolic condensation products, hard rubber and the like, the improvement which comprises forming a sheet of a rubber compound including a vulcanizing agent, zinc oxide and glue, exposing a surface of the sheet to actinic radiation for a period sufficiently beyond that at which the tackiness of the rubber may be increased to reduce its tackiness and vulcanizing the sheet with the exposed surface in contact with said material.

9. In joining vulcanized rubber compounds to metals, glass, molded phenolic condensation products, hard rubber and the like, the improvement which comprises forming a sheet of a rubber compound including a vulcanizing agent, zinc oxide and paracoumarone-indene resin, exposing a surface of the sheet to actinic radiation for a period sufficiently beyond that at which the tackiness of the rubber may be increased to reduce its tackiness and vulcanizing the sheet with the exposed surface in contact with said material.

10. The method of joining rubber compounds to metal, glass, molded phenolic condensation products, hard rubber and the like, which comprises exposing to actinic radiation at least parts of a sheet of unvulcanized rubber, including a vulcanizing agent, for a period sufficiently beyond that at which the tackiness of the rubber may be increased to reduce the tackiness of the exposed portions of said sheet and to improve the adhesion thereof with such substances when the exposed surface is vulcanized in contact therewith, inserting said sheet between the first-mentioned rubber compound and the material to which it is to be joined with the exposed surface against said material, and vulcanizing said sheet of rubber compound in that position.

11. The method of joining rubber compounds to metal, glass, molded phenolic condensation products, hard rubber and the like, which comprises exposing to actinic radiation at least parts of one surface of a sheet of unvulcanized rubber compound, including a vulcanizing agent, a compounding material from the class consisting of zinc oxide, clay or barytes, and an adhesive from the class consisting of glue and paracoumarone-indene resin, for a period sufficiently beyond that at which the tackiness of the rubber may be increased to reduce the tackiness of the exposed portions of said sheet and to improve the adhesion thereof with such substances when the exposed surface is vulcanized in contact therewith, inserting said treated sheet between the first-mentioned rubber compound and the material to which it is to be joined, with the exposed surface against said material, and vulcanizing said sheet of rubber compound in that position.

12. The method of improving the capacity of a rubber compound to adhere to metal, glass, molded phenolic condensation products, hard rubber or the like, which comprises exposing to actinic radiation at least parts of a sheet of unvulcanized rubber compound including a vulcanizing agent for a period sufficiently beyond that at which the tackiness of the rubber may be increased to decrease the tackiness of the exposed portions of said sheet and to improve the adhesion of said compound with such substances when the exposed surface is vulcanized in contact therewith.

13. The method of improving the capacity of a rubber compound to adhere to metal, glass, molded phenolic condensation products, hard rubber or the like, which comprises exposing to actinic radiation one and only one surface of a sheet of unvulcanized rubber compound including a vulcanizing agent for a period sufficiently beyond that at which the tackiness of the rubber may be increased to reduce the tackiness of the exposed surface and to improve the adhesion of said compound with such substances when the exposed surface is vulcanized in contact therewith.

14. The method of improving the capacity of a rubber compound to adhere to metal, glass, molded phenolic condensation products, hard rubber or the like, which comprises exposing to actinic radiation at least parts of a sheet of unvulcanized rubber compound including a vulcanizing agent, a compounding material from the class consisting of zinc oxide, clay and barytes, and an adhesive from the class consisting of glue and paracoumarone-indene resin for a period sufficiently beyond that at which the tackiness of the rubber may be increased to reduce the tackiness of the exposed portions of said sheet and to improve the adhesion thereof with such substances when the exposed surface is vulcanized in contact therewith.

15. An article of manufacture as produced by the method of claim 10.

16. A rubber sheet as produced by the method of claim 12.

DANIEL S. MORSE.